United States Patent [19]

Jeon et al.

[11] Patent Number: 4,837,262

[45] Date of Patent: Jun. 6, 1989

[54] NON-TOXIC WRAPPING FILM FOR THE PACKING OF FOODSTUFFS AND THE LIKE

[76] Inventors: Byung S. Jeon, 22, Azashokoji, Ohtakacho, Midori-Ku, Nagoya-City; Takeo Namba, 4-1533 Kojimadanoguchi, Kurashiki-City, Okayama-Ken, both of Japan

[21] Appl. No.: 1,746

[22] Filed: Jan. 9, 1987

[30] Foreign Application Priority Data

Feb. 22, 1986 [KR] Rep. of Korea .............. 86-1286

[51] Int. Cl.$^4$ ............................................... C08K 5/09
[52] U.S. Cl. ............................................... 524/322; 524/399; 524/400
[58] Field of Search .................... 524/322, 399, 400

[56] References Cited

U.S. PATENT DOCUMENTS 4,010,127 3/1977 Taka ..................................... 524/322
4,552,930 11/1985 Hirota ................................. 526/348

Primary Examiner—Joseph L. Schofer
Assistant Examiner—Peter D. Mulcahy
Attorney, Agent, or Firm—Brooks Haidt Haffner & Delahunty

[57] ABSTRACT

An improved food wrapping film is produced by extruding a mixture of linear low density polyethylene with low density polyethylene and a resin modifier, further mixed with a mixture of edible oil, calcium and aluminum stearates, polybutene, a surface active agent and a petroleum resin. Surface characteristic is further modified by coating the film with a mixture of edible oil, polybutene, and petroleum resin.

8 Claims, No Drawings

NON-TOXIC WRAPPING FILM FOR THE PACKING OF FOODSTUFFS AND THE LIKE

BACKGROUND OF THE INVENTION

In prior art, PVC, Polyvinylidene chloride, Ethylene vinyl acetate, LD-PD etc. were utilized as materials of wrap film manufacturing. However, considering prices, properties, and stabilities, among, for the most, LD-PE, PVC, Polyvinylidene and Polybutadien are used as material of wrap film for home-use, and for business purpose, PVC is generally used.

The wrap film manufactured from PVC which is in use in great quantities for business purpose generate not only Hydrochloride and Chlorine gas but also cancerogenic substance.

Further, although the transparency is suitable, stability is in question and there is a severe defect that will cause a noxious factor to the human body.

SUMMARY OF THE PRESENT INVENTION

This invention relates to the non-toxic wrap film for food packing, and more particularly, non toxic LLD-PE wrap film and the process thereof.

To put concrete, at individual homes, various kinds of subsidiary articles of diet as well as flesh and meats, also at super-markets, meat shops and food processing plants, foods are packed into containers for the purpose of preservation of foods without deterioration.

Therefore, this invention, non-toxic wrap film must keep transparency, contractibility, anti-fogging (or frost) character and barrier property as well as moderate intensity that is harmless for human body.

DETAILED DESCRIPTION OF THE PRESENT INVENTION

This invention relates to the non-toxic wrap film for food packing, and more particularly, to non-toxic LLD-PE wrap film and the process thereof.

Recently, at individual homes, various kinds of subsidiary articles of diet as well as flesh and meats, also at super-markets, meat shops and food processing plants, foods are packed into containers for the purpose of preservation of foods without deterioration. Therefore, this invention, non-toxic wrap film must keep transparency, contractibility, anti-freeze character and barrier property as well as moderate intensity that harmless for human body.

The term "wrap" as used herein is intended to indicate a film that should be extremely thin in thickness within the range of 8–20μ (0.008–0.02 mm) in order to wrap both fresh and processed foods. Such wrap film also must possess the following properties essentially.

(1) Property of food preservation.
 (a) Physical properties (moderate intensity, tear strength, expansibility and contractibility)
 (b) Barrier property (dampproof, water-proof, air-resistant and air permeability)
 (c) Stability (water-proof, acid-resistant, oil-resistant, heat-resistant and winterization)
 (d) Hygienic property (Absolutely non-poisonous is required.)
(2) Workability
 (a) Film must be suitable for packing-work.(moderate cohesiveness is necessary)
 (b) Easy-cutting is required.
 (c) Also required that easily can be separated from other substances.
(3) Maintenance of commodity value.
 (a) Colorless and transparent.
 (b) Property of dispersing dew and anti-freeze.
 (c) Property of gloss smoothing (must be seen as clean in appearance).
(4) Stable supply at low price.

In this way, by keeping those properties as mentioned above, the wrap film is able to obtain a superior effeciency for food-packing.

In prior art, PVC, Polyvinylidene chloride, Polybutadien, Ethylene vinyle acetate, LD-PE etc. were utilized as materials for wrap film manufacturing. However, considering of prices, properties and stabilities, among, for the most, LD-PE, PVC, Polyvinylidene and Polybutadien are used as material of wrap film for home-use. And for business purpose, PVC is generally used. The wrap film manufactured from PVC which is in use in great quantities for business purpose generate not only Hydrochloride and Chlorine gas but also cancerogenic substance. Further, although the transparency is suitable, stability is in question and there is a severe defect that will cause a noxious factor to the human body. And LD-PE is lacking in transparency, intensity, workability and commodity value.

Accordingly, the purpose of this invention is to provide the manufacturing methods of wrapping film which is untoxious for human body, accompanying with suitable intensity, transparency, work efficiency and excellent commodity value.

The inventors of this subject accomplished, through making wider and deeper studies, their work to manufacture wrapping film for both home-use and business-use employing LLD-PE (Approved additives by FDA, U. S. A.) as a chief material which met demands of necessary factors such as untoxious for human body, strong intensity, stability and low-cost etc.

In general, LLD-PE is known that has superior intensity, is non toxic and has low price. However, on the other side, the cutting efficiency, transparency, cohesiveness and anti-fogging character are inferior, making it generally unsuitable to be a material of wrap film.

Thereat, this invention is characterized by solving such inferiorities and producing excellent wrapping film. Hitherto, LLD-PE has inferior points and even if produced by the quenching method, it was placed a check as to the transparency (haze 3–5) by the opaque, surface luminance and unleveling. And, when producing of this film by the method of inflation, also the transparency is inferior since Haze 9–10 is generally obtained.

However, this invention maximized crystallization by moderate mixture of petroleum resin and elutioning of edible liquid oil (such as soybean oil, sesame oil and corn oil) to the substance that hinders the transparency in the surface so as to remove surface reflex and obtain transparency. Further, polybutene which is used for getting cohesiveness contributes to increase the transparency. So that, the transparency (Haze 1–1.5) of the LLD-PE wrap film is remarkably improved.

As to the cohesiveness, by applying the following mixture, as a additive that has enough cohesiveness, compounded with (1) polybutene having a molecular weight of 800–3650, (if desired, polyisobutylene having a molecular weight of 10,000), (2) petroleum resin and (3) edible oil (corn oil is more preferred), necessary cohesiveness is obtainable without decline of workability. At the same time, the obstacle factor of packing stability has vanished by the repulsion which LLD-PE naturally has, and then excellent packing film was produced. Further, as often generates phenomenon of dew in the surface of the film, the contents appear opaque and reduce the commodity value. Hitherto, such phenomenon of dew has been solved and the transparency increased by applying a surface active agent which has both a hydrophilic radical and a hydrophobic radical.

However, according to the premise that most of non-poisonous film must be manufactured, minimized to possible small quantity of use of surface-active agent, and instead, let the additives flow to the surface of film on the process of film-producing by a padding roll applicator and/or pre-mixed, so that kept away the phenomenon of dew for long period.

Further, LLD-PE has wide expansibility and inferior cutting property. Though this problem can be solved by use of a T-Die extruder and inflation process, it will increase the cost.

Therefore, by mixing with LD-PE the character of the film for its cutting property is improved. The reason why the character of the film changed is that when LD-PE was mixed with LLD-PE with a modifier medium resin, (e. g. copolymer of ethylene and α-olefin), the expansibility of LLD-PE suddenly reduced in the direction of the vertical axis. Such phenomenon was used.

The present invention is described in detail with reference to the following examples.

EXAMPLE 1

| | |
|---|---|
| (a) Base resin (wt. %) | |
| LLD-PE(NOVACOR 0118A) | 84% |
| LD-PE #5316 | 12% |
| PE modifier(Tafmer A 4090) | 4% |
| *1. NOVACOR is a Trademark of NOVACOR INC. Canada | |
| 2. LD-PE #5316 is a product of HANYANG CHEMICAL Inc. Korea | |
| 3. Tafmer is a copolymeric elastomer of ethylene and α-olefin, a polymer modifier, product of MITSUI CHEMICAL Inc. Japan | |
| (b) Additives (wt. %) | |
| Surface-active agent (Higher alcohol glyceride 5% and/or fatty acid glyceride 5%) | 10% |
| Corn oil | 10% |
| Calcium stearate | 13% |
| Alminum stearate | 10% |
| Polybutene | 47% |
| Petroleum Resin(ARKON P-100) (Product of Arakawa Chemical Co., Ltd. Japan) | 10% |

Above additive (at 2% of wt. ratio) was added to the base resin and mixed well. The mixture was extruded forming film by normal method (film thickness 8–10μ). This produced wrap film suitable for home-use having superior properties of non-toxic, cutting efficiency and cohesiveness.

The process condition for film using the inflation extruder is as follows:

| | |
|---|---|
| Film Machine used: | |
| Temperature: | |
| Cylinder $C_1$ | 135° C. |
| $C_2$ | 165° C. |
| $C_3$ | 190° C. |
| $C_4$ | 190° C. |
| Adapter | 187° C. |
| Rotary Socket | 185° C. |
| Die $D_1$ | 183° C. |
| $D_2$ | 185° C. |
| Speed of rolled up: 60 m/min | |

EXAMPLE 2

| | |
|---|---|
| (a) Raw material base resin (A) is mixed as in example 1 | |
| (b) Additive (B) (wt. %) | |
| Corn oil | 20% |
| Alminium stearate | 8% |
| Calcium stearate | 8% |
| Polybutene | 43% |
| Surface-active agent | 9% |
| Petroleum resin | 12% |
| (c) Additive (C) (wt. %) | |
| Corn oil | 10% |
| Polybutene | 78% |
| Petroleum resin | 12% |

To the above Raw material (A) was added the additive (B) at 5.5% of wt. ratio and mixed well, and film extruded to a thickness of 10–12μ. After that 2–5 wt.% ratio of the additive (C) was coated on the film by a 3-rolled padding roller applicator.

The thus obtained the wrap film, suitable for business-use, possesses superior properties of anti-freeze, moderate intensity and good transparency for commodity-packing.

What is claimed is:

1. Non-toxic film for wrapping foodstuffs comprising the extrusion product resulting from extruding a resin mixture consisting essentially of:
    (a) a base resin mixture (A) of from 66 to 100 weight percent linear low density polyethylene (LLD-PE), from 10 to 30 weight percent low density polyethylene (LD-PE), and from 2 to 8 weight percent polyolefin-based resin modifier; and
    (b) an additive mixture (B) of from 10 to 20 weight percent edible oil, from 8 to 12 weight percent calcium stearate, from 7 to 11 weight percent aluminum stearate, from 43 to 47 weight percent polybutene, from 7 to 10 weight percent surface active agent, and from 10 to 12 weight percent petroleum resin;
    where said additive mixture (B) is mixed with said base resin mixture (A), based upon the weight of said mixture (A), in the ratio of 2 to 8 weight percent (B).

2. Non-toxic film according to claim 1, wherein said edible oil is corn oil.

3. Non-toxic film according to claim 1, wherein said film has a thickness from 8 to 20 micrometers.

4. Non-toxic film according to claim 1, wherein said extrusion product has 2 to 5 weight percent of a coating on a surface of the extrusion product based upon the weight of the extrusion product, said coating being formed from a mixture consisting essentially of from 5 to 15 weight percent edible oil, from 70 to 90 weight percent polybutene, and from 5 to 15 weight percent petroleum resin.

5. Non-toxic film according to claim 4, wherein said edible oil is corn oil.

6. Non-toxic film according to claim 4, wherein said film has a thickness of 8 to 20 micrometers.

7. Non-toxic film according to claim 1, wherein said base resin mixture (A) consists essentially of 84 weight percent LLD-PE, 12 weight percent LD-PE, and 4 weight percent polyolefin-based resin modifier.

8. Non-toxic film according to claim 7, wherein said extrusion product has 2 to 5 weight percent of a coating on a surface of the extrusion product based upon the weight of the extrusion product, said coating being formed from a mixture consisting essentially of from 5 to 15 weight percent edible oil, from 70 to 90 weight percent polybutene, and from 5 to 15 weight percent petroleum resin.

* * * * *